United States Patent
Hansen et al.

(10) Patent No.: US 7,323,151 B2
(45) Date of Patent: Jan. 29, 2008

(54) PROCESS FOR THE SELECTIVE REMOVAL OF SULPHUR COMPOUNDS FROM SYNTHESIS GAS

(75) Inventors: Jens-Henrik B. Hansen, Kgs. Lyngby (DK); Birgitte Hammershoi, Vedbæk (DK); Inga D. Sigurdardottir, Reykjaviik (IS)

(73) Assignee: Haldor Topsoe A/S, Lyngby (DK)

( * ) Notice: Subject to any disclaimer, the term of this patent is extended or adjusted under 35 U.S.C. 154(b) by 279 days.

(21) Appl. No.: 10/501,089

(22) PCT Filed: Feb. 15, 2003

(86) PCT No.: PCT/EP03/01539

§ 371 (c)(1),
(2), (4) Date: Feb. 4, 2005

(87) PCT Pub. No.: WO03/068370

PCT Pub. Date: Aug. 21, 2003

(65) Prior Publication Data

US 2005/0123462 A1    Jun. 9, 2005

(30) Foreign Application Priority Data

Feb. 18, 2002    (DK)    ............... 2002 00243

(51) Int. Cl.
*C01B 3/50*    (2006.01)
*C01B 3/58*    (2006.01)

(52) U.S. Cl. ............ 423/230; 423/244.01; 423/244.02; 423/244.06; 423/244.1; 502/517

(58) Field of Classification Search ................ 252/373; 502/517, 53; 423/230, 244.01, 244.02, 244.06, 423/244.1

See application file for complete search history.

(56) References Cited

U.S. PATENT DOCUMENTS

| | | | | |
|---|---|---|---|---|
| 4,455,286 A | * | 6/1984 | Young et al. | ............... 423/230 |
| 4,521,387 A | | 6/1985 | Broecker et al. | |
| 4,871,710 A | * | 10/1989 | Denny et al. | ............... 502/414 |
| 4,983,365 A | * | 1/1991 | Denny et al. | ............... 423/230 |
| 4,983,367 A | * | 1/1991 | Denny et al. | .......... 423/244.06 |
| 5,674,463 A | * | 10/1997 | Dao et al. | ................... 423/230 |
| 5,853,681 A | * | 12/1998 | Denny et al. | ............... 423/225 |
| 6,251,348 B1 | * | 6/2001 | Scranton, Jr. | .......... 423/244.01 |

FOREIGN PATENT DOCUMENTS

| | | |
|---|---|---|
| DE | 266744 | 4/1989 |
| EP | 0 243 052 | 10/1987 |
| EP | 0 599 351 A1 * | 6/1994 |

* cited by examiner

*Primary Examiner*—Timothy C. Vanoy
(74) *Attorney, Agent, or Firm*—Dickstein Shapiro LLP

(57) ABSTRACT

A process for the selective removal of sulphur compounds from synthesis gas being rich in carbon monoxide and containing hydrogen, carbon monoxide and containing hydrogen, carbon dioxide and steam comprising contacting the synthesis gas at a maximum contact temperature of 100° C. with an absorbent comprising Cu/ZnO compounds and being prepared by thermal decomposition of a corresponding carbonate and activation of the thermal decomposed carbonate with a reducing gas.

3 Claims, 4 Drawing Sheets

Temperature programmed reduction of mixed basic carbonates

Absorption of sulphur at 40°C and 21 bar on Cu/ZnO/Al2O3

PROCESS FOR THE SELECTIVE REMOVAL OF SULPHUR COMPOUNDS FROM SYNTHESIS GAS

This invention relates to a process for the selective removal of $H_2S$ from synthesis gas being rich in carbon monoxide and further containing hydrogen, carbon dioxide and steam.

Selective removal is defined as a removal process being basically neutral with respect to the reactants contained in the synthesis gas, i.e. contents of other than impurities, steam and inert gas is not changed to any substantial degree. In addition, formation of components not already contained in the synthesis gas must be avoided. In praxis side-reactions must be suppressed to a level lower than 1000 vol ppm levels.

All concentrations given in present description are by volume.

$H_2S$ and other sulphur compounds are poisonous to a wide range of catalysts e.g. nickel, iron and copper based catalysts fed with synthesis gas and used for synthesis in the industry. The catalysts are deactivated in contact with catalyst poisons contained in the gas. Sulphur compounds form stable compounds on the catalytic surface and block its active sites.

Therefore, selective removal of sulphur as defined above is industrially useful for removal of sulphur compounds down-stream to reformers producing synthesis gas from hydrocarbons in chemical plants.

Examples, where downstream selective removal of sulphur compounds from synthesis gas is useful, include removal of $H_2S$ and COS from synthesis gas generated in high temperature autothermal reformers. In an autothermal reformer sulphur may be acceptable in the hydrocarbon feed and all sulphur in the feed will be converted to $H_2S$ and minor amounts of COS.

As the catalysts in the downstream synthesis section are susceptible to sulphur poisoning, sulphur must be removed to the low ppb level (<5 ppb). The sulphur removal is to be obtained either at inlet to the synthesis gas preparation section upstream to the reformer, or alternatively downstream to the reformer, in case the synthesis gas preparation section is tolerant to sulphur.

When downstream removal of sulphur compounds is applied, the removal process must fulfill certain requirements in terms of selectively. In general, it is not desired to change the composition of the synthesis gas generated.

Especially, components not already contained in the synthesis gas must not be formed, as these interfere in the synthesis section and in the purification of the final product.

Further, in general a loss of the content of carbon monoxide in the synthesis gas of more than 0.5% relative would in most cases be unacceptable due to process economics.

Furthermost, for some syntheses, for example in Fischer-Tropsch and oxo-alcohol synthesis, the ratio of the components $H_2/CO$ in the synthesis gas is very critical, thus a change in composition due to sulphur removal is unacceptable.

When operating the removal process in praxis, selective removal of sulphur requires reduction of sulphur concentration to below 5 ppb in the treated synthesis gas. The removal process shall affect only impurities, steam and inerts, and no more than about 1000 ppm of components already contained in the gas must be formed by the process.

Synthesis gas generated in reformers comprises conventionally both substantial amounts of carbon monoxide, hydrogen, carbon dioxide, steam, various inert compounds and impurities. In other applications synthesis gas is generated with very low levels of carbon dioxide, such as coal gasifiers. By all means synthesis gas generated in either reformers or gasifiers is rich in carbon monoxide and further contains hydrogen, steam and more or less carbon dioxide.

Thus, the synthesis gas to be treated by selective removal of sulphur is rich in carbon monoxide and further contains hydrogen, carbon dioxide and steam.

The typical pressure of a synthesis gas exit the reformer, and accordingly the pressure level of interest of selective sulphur removal, is in the range 15-80 bar.

The most conventionally used means of $H_2S$ removal from a gas stream is passing the gas through a bed of zinc oxide at elevated temperatures, typically from 300-450° C. Use of conventional zinc oxide absorbents is inappropriate in $H_2S$ removal from wet synthesis gases being rich in carbon monoxide. Steam decreases the efficiency of $H_2S$ removal through the absorption reaction:

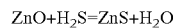

$$ZnO+H_2S=ZnS+H_2O$$

In wet synthesis gas sulphur content exceeds thus the sulphur tolerance limit of down stream catalysts. Further, ZnO absorbents are active catalysts in the water gas shift reaction at usual operating conditions.

Further common $H_2S$ absorbents being based on nickel or copper, capable of reducing $H_2S$ concentration to much lower levels cause unwanted side reactions like hydrocarbon formation, water gas shift and methanol synthesis.

EP 243,052 discloses agglomerates of copper and zinc and/or metals of Groups IIIA, IVA, VA, VIA and VIIA in form of oxides, hydroxides, carbonates and/or basic carbonates as useful sulphur absorbents in natural gas, NGL or liquid refinery products. The fluids to be treated are preferably free of reducing gases.

We have found that unreduced basic carbonates are not useful in sulphur removal from synthesis gas, because basic carbonates are reduced by the reducing synthesis gas at temperatures as low as 55° C. At 40° C. the reduction of the absorbent is absent or progresses very slowly, however, minor operational upsets will lead to temperature increments initiating the reduction process resulting in detrimental temperatures run-away.

U.S. Pat. No. 4,521,387 relates to sulphur absorbents in form of a Cu/ZnO catalyst, which is prepared by thermal decomposition of $Cu_xZn_y(OH)_6(CO_3)_2$. The absorbent is employed in deep purification of synthesis gas for the removal of e.g. $H_2S$ and other impurities at a temperature of 100° C.

Undesired side-reactions during removal of sulphur from synthesis gas by use of the above absorbents are not discussed in EP 243,052 and U.S. Pat. No. 4,521,387.

Furthermore, U.S. Pat. No. 4,521,387 does not describe examples of desulphurisation of synthesis gas containing CO, $H_2$, steam and $CO_2$. Example 3 of this reference discloses deep desulphurisation of a synthesis gas comprising CO and $H_2$ but no steam or $CO_2$.

It is generally known that the absorbent applied in U.S. Pat. No. 4,521,387 catalyses the production of methanol predominantly through the activation of $CO_2$.

Activation of $CO_2$ and CO for methanol synthesis are quite independent. It was first found by Rozovskii (Yu. B. Kagan et al, Dokl. Akad. Nauk SSR, 221, 1093, (1975)) by means of an isotope doping method that methanol is synthesised from $CO_2$ and not from CO over the Cu catalyst as present. The experiment was confirmed by Ken Waugh (G. C. Chinchen et al, appl. Catal., 36, 1-65, (1988)).

It is generally known that the absorbent applied in U.S. Pat. No. 4,521,387 also catalyses the water gas shift reaction.

Methanol synthesis and water gas shift reactions are catalysed according to the following reaction schemes:

$$3H_2 + CO_2 \leftrightharpoons CH_3OH + H_2O \qquad (1)$$

$$CO + H_2O \leftrightharpoons CO_2 + H_2 \qquad (2)$$

It is known that a Cu/ZnO catalyst, if being active in reaction 1, is also active in reaction 2. Thus, any CO converted into methanol is converted through the shift reaction 2.

Due to the exothermic nature of the above reactions, the equilibrium conversion is decreasing with increasing temperature, thus the lower the equilibrium temperature the higher the equilibrium conversion.

Whether or not the catalysis through the above schemes takes place to any substantial degree (conversion corresponding to more than 1000 ppm methanol), depends apart from the catalytic activity also on the thermodynamic potential of the feed gas.

Below is given equilibrium concentrations of methanol and conversions of carbon monoxide according to reaction schemes 1 and 2 for a series of synthesis gas compositions.

Syngas composition A (Carbon dioxide composition from acid gas wash as per Example 2 of U.S. Pat. No. 4,521,387): 97.45% $CO_2$, 0.1% $H_2$ and 2.45% $H_2O$. Pressure=3 bar.

Syngas composition B (Synthesis gas composition from partial oxidation as per Example 3 of U.S. Pat. No. 4,521,387): 48.5% CO and 51.5% $H_2$. Pressure=21 bar. Syngas composition C (Synthesis gas composition as per our Example 1): 49% $H_2$, 20% $H_2O$, 25% CO, 5% $CO_2$ and 1% $CH_4$. Pressure=31 bar. Cooled and separated at operating temperature of the sulphur removal unit.

Syngas composition D (Syngas gas composition as per our Example 4): 70.48% H2 (balance), 0.02% $H_2O$, 16.3% CO, 10.2% $CO_2$, 3.0% Ar. Pressure=21 bar.

Syngas composition E (Synthesis gas composition as per our Example 5, steam/dry gas ratio of 0.028): 70.53% $H_2$, 14.1% CO, 9.72% $CO_2$, 2.92% Ar, 2.72% $H_2O$. Pressure=21 bar.

Synthesis gas from downstream reformers typically contains more than 5% CO, at least 1% CO, and further contains $H_2$ and $CO_2$ (and the synthesis gas is typically saturated with steam at temperatures below 100° C.).

In the pressure range 15-80 bar and at a temperature 15-100° C. the thermodynamic potential for methanol synthesis of a gas containing at least 5% CO, at least 5% $H_2$, at least 0.5% $CO_2$ and optionally further containing water in a concentration up to saturation at a temperature of 100° C. is more than 1000 ppm of methanol.

At higher pressure and/or lower temperature the potential for methanol synthesis in above composition increases.

Such synthesis gas has to be desulphurised over an absorbent not catalysing the methanol reaction at absorption conditions.

The general object of this invention is to provide an improved processes for selective removal of sulphur compounds from synthesis gas being rich in carbon monoxide and further containing both hydrogen, carbon dioxide and steam.

It has been found that an absorbent of reduced Cu/ZnO/$Al_2O_3$ removes $H_2S$ and COS to below 5 ppb levels in such a synthesis gas with high sulphur capacity. It has also been observed that methanol synthesis does not occur at 40° C. or at 125° C. and that conversion of CO through the water gas shift reaction is absent at 100° C. or below.

Useful absorbents comprise Cu/ZnO compounds prepared by thermal decomposition of the respective carbonate and subsequent activation with reducing gas (e.g. $H_2/N_2$) and compositions of copper on ZnO carrier.

In accordance with the above object and observations, this invention is a process for the selective removal of sulphur compounds from synthesis gas containing at least 5% carbon monoxide, at least 5% hydrogen and at least 0.5% carbon dioxide and optionally further containing water in a concentration up to saturation comprising contacting the synthesis gas at a maximum contact temperature of 100° C. with an absorbent comprising Cu/ZnO compounds and being activated with a reducing gas.

TABLE 1

Potential for methanol and shift reactions. Equilibrium concentrations and conversions.

| Syngas Composition | Equilibrium Temperature [Deg. C.] | Concentration of $CH_3OH$ in effluent, [%] | Conversion of CO to $CH_3OH$, [%] | Conversion of CO by shift alone, [%] |
|---|---|---|---|---|
| A | 100 | <<0.1 | ÷, No CO in feed | ÷** No CO in feed |
| B | 100 | 0* No $CO_2$ or $H_2O$ in feed | 0* No $CO_2$ or $H_2O$ in feed | 0 No $H_2O$ in feed |
| C | 40/100 | 78/58 | 99.9/99.8*** | 0.79/11 |
| D | 40/125 | 41/25 | >99.9/>99.9*** | 0.12/−0.05 low $H_2O$ in feed |
| E | 100 | 25 | 99.9*** | 19 |

*The equilibrium conversions to $CH_3OH$ for Syngas B is calculated on the basis that the activation of CO does not take place on the catalyst: $2H_2 + CO \rightarrow CH_3OH$, as shown by Rozovskii.

**Equilibrated gas contains 11 ppm of CO, build by reverse shift. The building of 11 ppm is far below the critical limit of the formation level of 1000 ppm of components not contained in the feed gas.

***CO is converted into methanol via the water gas shift reaction as water is present in the feed.

An advantage of the reduced copper based absorbents, in which copper metal is active, is the ability to remain stable in synthesis gas rich in carbon monoxide even if exposed to higher temperatures.

In addition to absorption of $H_2S$ reduced copper based absorbents are effective absorbents in removing COS being formed by side-reactions, $$H_2S+CO_2 \leftrightarrows COS+H_2O$$

$$H_2S+CO \leftrightarrows COS+H_2$$

in the absorber or up-stream the absorber at certain process conditions.

In further an embodiment of the invention the absorbent is useful to remove sulphur being added to synthesis gas to suppress metal dusting in chemical plants as described in more detail below.

Metal dusting corrosion is a well-known phenomenon in the chemical industry described in numerous publications. Metal dusting corrosion involves disintegration of metals and alloys into small particles of metal, metal carbides, metal oxides and carbon.

A key element of metal dusting is the transfer of carbon from the gas phase to the metal or alloy.

Affinity for carbon formation decreases with increasing temperatures. The temperature below which is affinity for carbon precipitation is called the Boudouard temperature. Typical Boudouard temperatures are in the range up to 1000° C.

Carbon monoxide is the predominant cause of metal dusting corrosion, but hydrocarbons have also been reported to cause metal dusting.

For kinetic reasons metal dusting only proceeds significantly at temperatures above a certain level, typically more than 300° C.

The metal dusting corrosion phenomenon is thus observed predominantly in the temperature range of 300° C. to 1000° C.

It is known that metal dusting is suppressed by the presence of $H_2S$ in carbon monoxide containing gas. Meanwhile, $H_2S$ is poisonous to down-stream catalysts, $H_2S$ content of the gas must be maintained at a very low level of 20 ppb.

In a number of industrial processes it is possible to use $H_2S$ as protecting agent against metal dusting, if the downstream processes accepts sulphur compounds or if the synthesis gas is passed through a $CO_2$ removal unit, wherein also $H_2S$ is removed. In the latter case a failure in operation of the $CO_2$ removal unit will cause irreversible inactivation of down-stream catalysts, if these are susceptible to sulphur poisoning.

Thus, in a specific embodiment of the present invention $H_2S$ is added to the synthesis gas up-stream to equipment being subjected to metal dusting, and subsequently selectively removed down-stream to the equipment.

In case the synthesis gas preparation section is tolerant to sulphur, the natural contents of sulphur in the hydrocarbon feed reformed is not removed and optionally supplementary $H_2S$ may be added at any position upstream the equipment subjected to metal dusting to provide $H_2S$ concentration in the synthesis gas being effective for the suppression of metal dusting down stream the reformer. $H_2S$ is then selectively removed downstream to the equipment.

Thus, in another aspect the invention provides use of the adsorbent in the suppression of metal dusting of iron or nickel alloys in contact with carbon monoxide rich synthesis gas at a Boudouard temperature above 300° C., further containing both hydrogen, carbon dioxide and optionally steam. Thereby, an amount of a $H_2S$ source is added to the synthesis gas upstream the metal surface being in contact with the gas in a concentration being sufficient to suppress metal dusting. Subsequently, the sulphur compound is selectively removed at a temperature below 100° C. downstream the metal surface.

The $H_2S$ source may be either a gas containing $H_2S$ or another sulphur compound, which at actual process conditions will decompose into $H_2S$, e.g. dimethyl disulphide.

The examples below demonstrate in more detail specific embodiments of the invention.

DETAILED DESCRIPTION OF THE PREFERRED EMBODIMENTS

EXAMPLE 1

Figure 1:
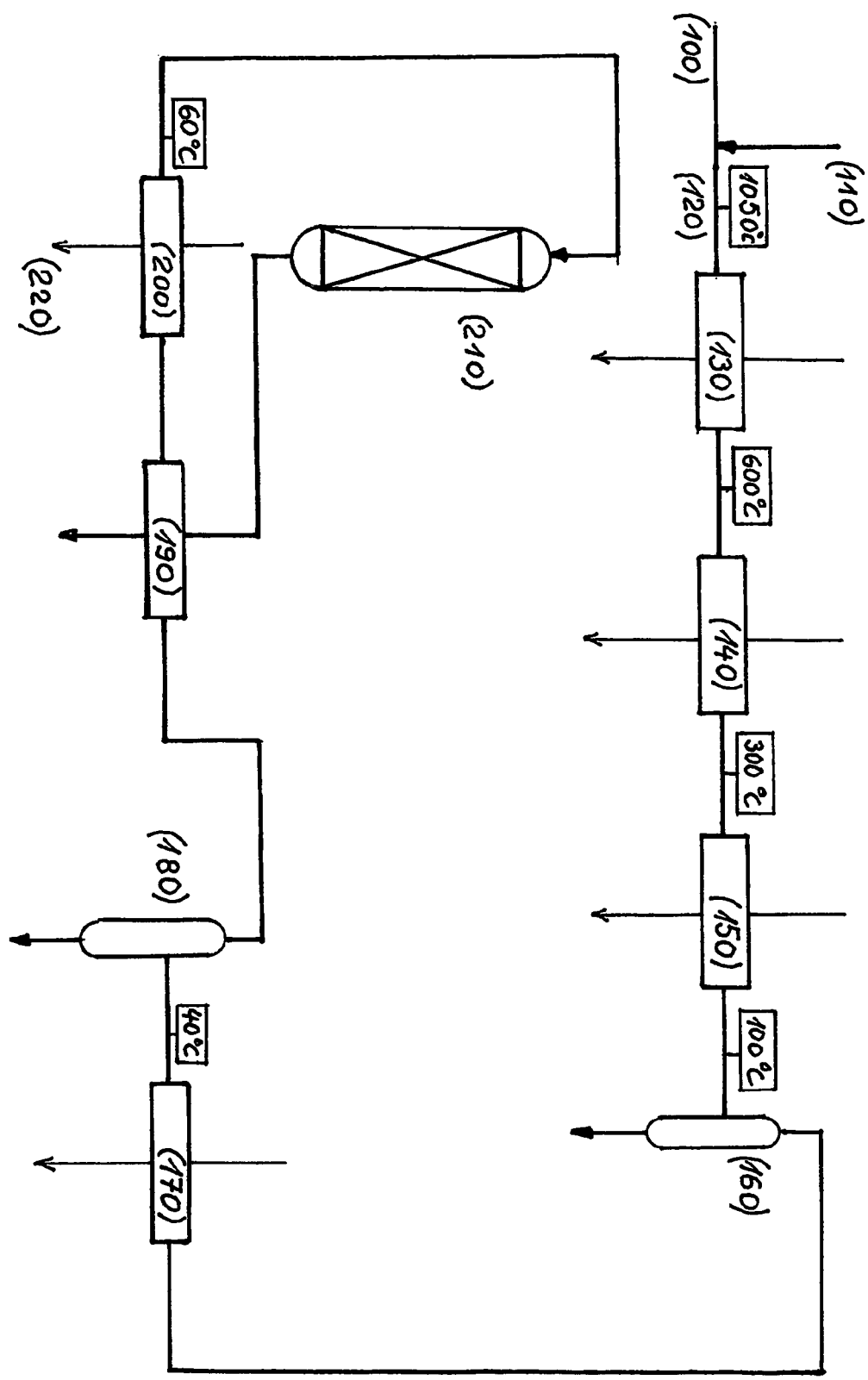
FIG. 1 is a simplified flow diagram of a process for selectively removing sulphur compounds from synthesis gas, in accordance with an embodiment of the present invention.

Reference is made to FIG. 1. In this specific embodiment of the invention Fe and Ni containing alloys being exposed to synthesis gas downstream an autothermal reformer are protected against metal dusting. The synthesis gas produced in an autothermal reformer is well suited for the synthesis of synthetic liquid fuel in a down stream Fisher-Tropsch synthesis section.

The synthesis gas exiting an autothermal reformer (100) at 30 bar gauge contains by volume percent approximately $H_2$ 49, $H_2O$ 20, CO 25, $CO_2$ 5 and $CH_4$ 1 corresponding to a Boudouard temperature of approximately 900° C. Potentially metal dusting will occur on Fe/Ni alloy surfaces between 300° C. and 900° C. if not protected.

$CH_3SSCH_3$ (110) is added to the synthesis gas effluent from the autothermal reformer. At the high temperature prevailing the $CH_3SSCH_3$ will thermally decompose and react with $H_2$ into $H_2S$. The amount of $CH_3SSCH_3$ added corresponding to approximately 1 ppm $H_2S$ by volume in the resulting admixture (120).

The admixture is led through a series of heat exchange operations, where it during cooling supplies heat to other processes or streams. The first heat exchange operation (130) is a gas heated heat exchange reformer which receives heat from the admixture, while the admixture cools from 1050° C. to approximately 600° C. The effluent from the gas heated heat exchange reformer (130) can in another lay-out be added to the synthesis gas from the autothermal reformer. The second heat exchange operation (140) is a boiler for steam production which receives heat from the admixture, while the admixture cools from 600° C. to approximately 300° C. During cooling of the admixture in the heat exchange operations (130) and (140) Fe and Ni containing alloys being exposed to the synthesis gas trans-passes a temperature range 700-500° C., wherein severe metal dusting is observed. H$_2$S contained in the admixture protects heat recovery equipment against metal dusting down to a temperature of 300° C., where metal dusting for kinetic reasons does no longer occur. Under the kinetic limit for metal dusting heat recovery equipment is protected by low operating temperature and H$_2$S is no longer needed for this purpose.

The third heat exchange operation (150) is a boiler feed water preheater which receives heat from the admixture, while the admixture cools from 300° C. to approximately 100° C. After the heat exchange operation (150), which brings the admixture to below the dew point of water, a first separation of process condensate is made (160). The fourth heat exchange operation (170) is a second boiler feed water preheater which receives heat from the admixture, while the admixture cools from 100° C. to approximately 40° C. After the heat exchange operation (170), separation of process condensate is again made (180). The saturated synthesis gas outlet of the last process condensate separation (180) is brought to conditions above the dew point of water contained in the synthesis gas, in this example by simply re-heating of the synthesis gas in the heat exchange operations (190) and (200). This re-heating must be done in case the downstream absorbent is susceptible to hydration.

Re-heated synthesis gas is introduced to a bed of sulphur absorbent (210), removing sulphur to a level below 5 ppb, acceptable to most down stream syntheses.

EXAMPLE 2

This Example is not an example of the present invention. It illustrates the ease of reduction of mixed basic carbonates exposed to a typical synthesis gas.

108 mg of mixed basic carbonates were loaded into a thermogravimetric reactor. In such a reactor the weight of the sample is continuously recorded. The reactor operates at atmospheric pressure. The sample was exposed to reducing gas with the composition by volume percent H$_2$ 66.6 (balance), H$_2$O 2.2, CO 18.4, CO$_2$ 9.8 and Ar 3.0 for approximately 6 days at 45° C. Then the temperature was raised to 55° C. and the experiment was run for another approximately 5 days.

Figure 2:
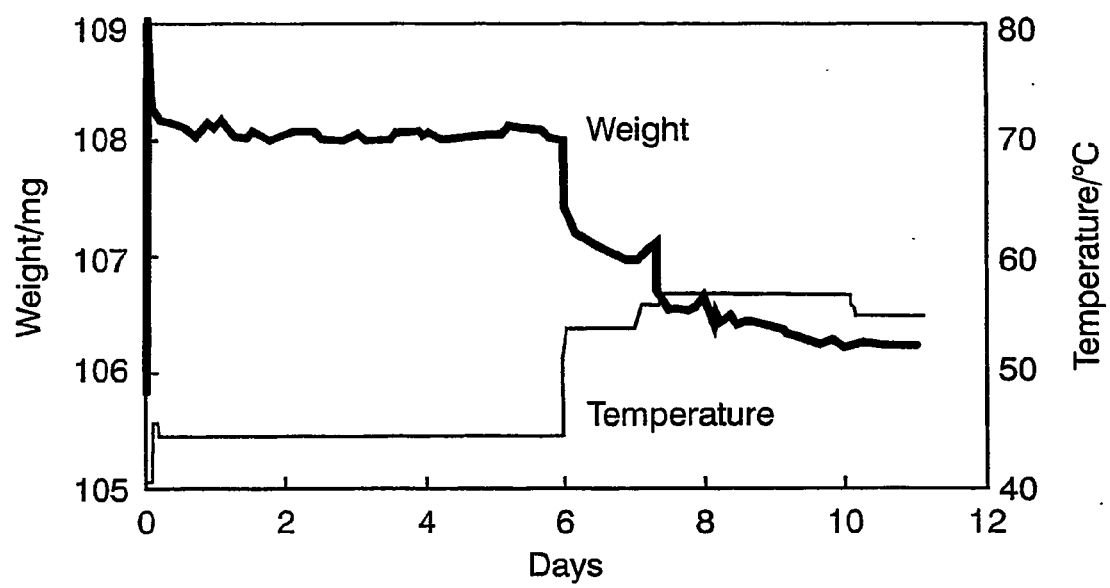
FIG. 2 is a graph illustrating the relationship between temperature and reduction of basic carbonates in the flow diagram of FIG. 1.

FIG. 2 shows that at 45° C. the weight of the sample of mixed basic carbonates is stable. Any reduction of mixed basic carbonates of copper would be accompanied by a weight loss through the reaction:

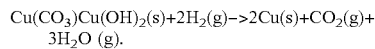

Cu(CO$_3$)Cu(OH)$_2$(s)+2H$_2$(g)–>2Cu(s)+CO$_2$(g)+ 3H$_2$O (g).

The mixed basic carbonates do not reduce in the synthesis gas at 45° C. because the weight of the sample remains stable.

In line with the above reduction is seen, as a slowly decreasing weight, when the temperature is increased to 55° C.

COMPARISON EXAMPLE 3

A test was made on desulphurisation of a synthesis gas at conditions typical of the outlet of the process condensate separation. The test was made on pure ZnO, more specifically on the catalyst type HTZ-3 available from Haldor Topsoe A/S, Denmark.

The test was carried out at accelerated conditions with a space velocity of approximately 10 times higher than a typical industrial space velocity and with a concentration of H$_2$S of approximately 5 times higher that what is needed to obtain a pronounced suppression of metal dusting corrosion.

Catalyst particles in the form of 4 mm cylinders were loaded in a plug flow reactor with an internal diameter of 5 mm. Thereafter, the test conditions were as follows:

| | |
|---|---|
| Temperature | 40° C. |
| Pressure | 20 bar gauge |
| Space velocity | 25,000 Nm$^3$ gas/m$^3$ catalyst/h |

Gas composition, percent by volume H$_2$ 70.48 (balance), H$_2$O 0.02 (approximately), CO 16.3, CO$_2$ 10.2, Ar 3.00, H$_2$S 3.2 ppm by volume, COS 70. ppb by volume.

Figure 3:
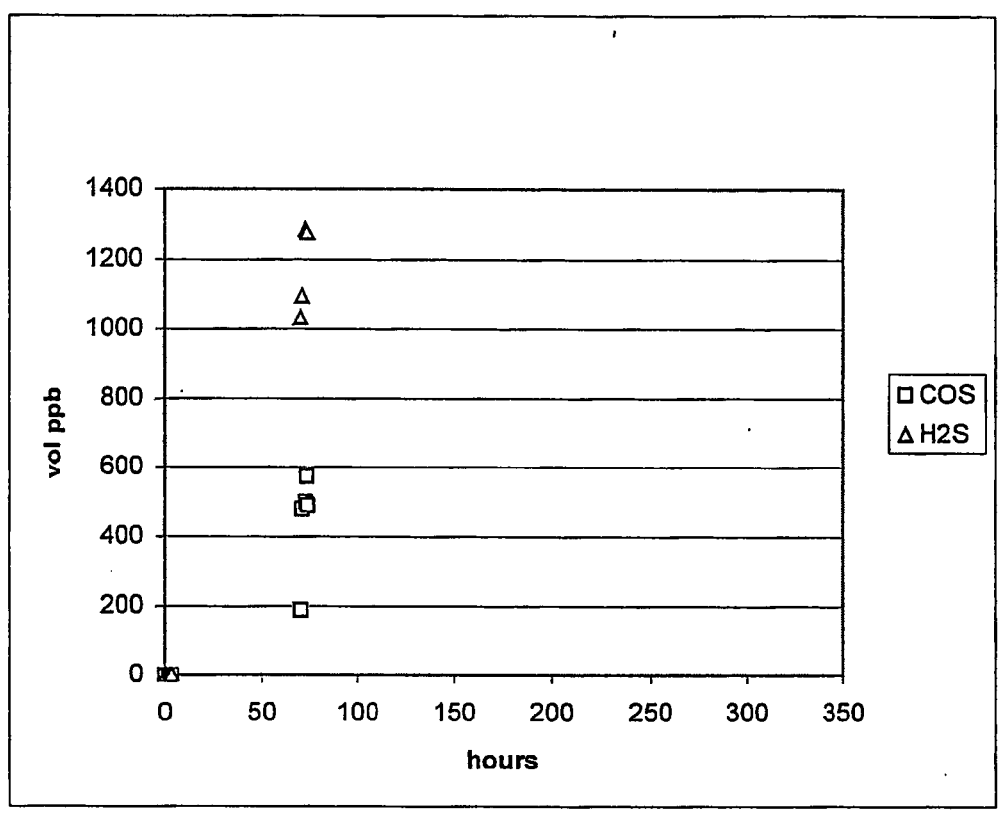
FIG. 3 is a graph illustrating the outlet concentration of $H_2S$ and COS as a function of time.

The results of the test are shown in FIG. 3, where the outlet concentration of H$_2$S and COS are given versus the time on stream. Breakthrough of sulphur is seen already after about 50 hours of operation. Pure zinc oxide is, thus, not suitable for this kind of desulphurisation.

EXAMPLE 4

This is an example of the present invention, as a reduced Cu/ZnO compound has been used for the desulphurisation of synthesis gas rich in carbon monoxide and further containing both hydrogen, carbon dioxide and steam, and as the potential for methanol synthesis is far more than 1000 ppm.

Example 3 was repeated, however, reduced Cu/ZnO/Al$_2$O$_3$ was used as absorbent instead of ZnO, more specifically the catalyst type ST-101 available from Haldor Topsoe A/S, Denmark. The ST-101 was reduced prior to the test.

Figure 4:
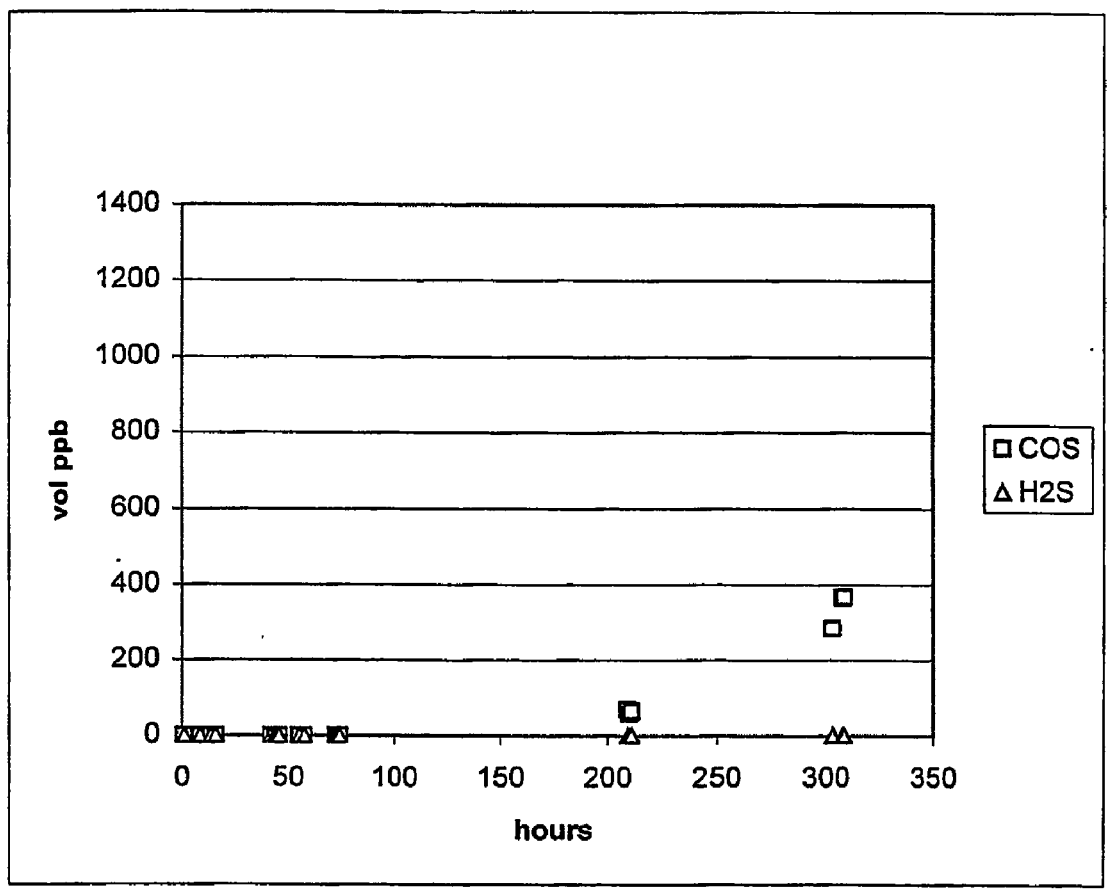
FIG. 4 is a graph illustrating the outlet concentration of $H_2S$ and COS as a function of time and in the presence of $Cu/ZnO/Al_2O_3$.

The results of the test are shown in FIG. 4, where the outlet concentration of H$_2$S and COS are given versus the time on stream. For Cu/ZnO/Al$_2$O$_3$ desulphurisation to the required low ppb level (5 ppb) is obtained for about 200 hours, where after a breakthrough of COS is seen. Methanol synthesis was absent also during at short time test at 125° C. after 66 hours of operation. When the test was terminated after 300 hours, H$_2$S was still below the detection limit of 5 ppb. The experiment was as mentioned before conducted with 10 times the normal space velocity and at 5 times the required H$_2$S level. Therefore, an estimated operation time for an industrial application will be at least 50 times the experimental run time. Thus, 200 hours of desulphurisation to below detection limit of COS and H$_2$S corresponds to 10000 hours of industrial operation below detection limit, which makes the process industrially useful.

Formation of COS can be explained by absorbed H$_2$S being converted by carbon monoxide in the feed gas to COS and hydrogen.

EXAMPLE 5

This Example relates to whether the reduced Cu/ZnO compound catalyses the water gas shift reaction at the desulphurisation temperatures. The Cu/ZnO compounds are known to be excellent water gas shift catalysts. Therefore, it is important for the present invention to establish how low the desulphurisation temperature should be in order to limit the conversion of CO through the water gas shift reaction to insignificant levels.

The conversion of CO, through the water gas shift reaction, is possible because the synthesis gas to be desulphurised often is saturated with water and because the thermodynamic affinity for water gas shift, being an exothermic reaction, is large at low temperatures.

Considering the conditions of Example 1 the synthesis gas leaving the first water separator at 100° C. will contain approximately 3% by volume of water. Therefore, the water gas shift reaction, in case it was catalysed by the sulphur absorbent, could lead to a large loss of CO from the synthesis gas.

The test on the water gas shift reaction was made on a $Cu/ZnO/Al_2O_3$ absorbent, more specifically the catalyst ST-101 available from Haldor Topsoe A/S, Denmark. Catalyst particles in the form of approximately 4 mm cylinders were loaded in a plug flow reactor with an internal diameter of approximately 5 mm. The catalyst was reduced, and thereafter the test conditions were as follows:

| | |
|---|---|
| Temperature | 148, 125 and 110° C. |
| Pressure | 20 bar gauge |
| Space velocity | 5400-8500 $Nm^3/m^3$ catalyst/h |

Dry gas composition, percent by volume: $H_2$ 72.50 (balance), CO 14.5, $CO_2$ 10.0, Ar 3.0.

Steam to dry gas ratio volume to volume: 0.028-0.090.

At 148° C. and 125° C. a significant conversion of CO through the water gas shift reaction was observed. At 110° C. conversion was hardly to be observed any more.

By extrapolation of the test results it shows that at 100° C. and at a typical industrial space velocity of 2500 $Nm^3/m^3$ catalyst/h, the conversion of CO will be only a fraction of a per thousand. In other words, and for practical purposes, the $Cu/ZnO/Al_2O_3$ absorbent does not catalyse the water gas shift reaction at 100° C. or below.

The invention claimed is:

1. A process for the selective removal of sulphur compounds from synthesis gas containing at least 5% carbon monoxide, at least 5% hydrogen, at least 0.5% carbon dioxide and water at a pressure of at least 15 bar comprising contacting the synthesis gas at a maximum contact temperature of 100° C. with an absorbent comprising Cu/ZnO compounds which has been activated with a reducing gas.

2. The process of claim 1, wherein the sulphur compounds comprise $H_2S$ and COS.

3. The process of claim 1, wherein the synthesis gas contains $H_2S$ in an amount effective for suppression of metal dusting of metals in contact with the synthesis gas within a temperature range between 300° C. to Boudouard temperature of the synthesis gas.

* * * * *